United States Patent
Crespin et al.

(10) Patent No.: US 10,288,248 B1
(45) Date of Patent: May 14, 2019

(54) DEVICE FOR AUTOMOTIVE LIGHTING

(71) Applicant: Valeo North America, Inc., Troy, MI (US)

(72) Inventors: Charles Crespin, Seymour, IN (US); Julien Hemon, Seymour, IN (US); Larry Boxler, Seymour, IN (US)

(73) Assignee: Valeo North America, Inc., Troy, MI (US)

( * ) Notice: Subject to any disclaimer, the term of this patent is extended or adjusted under 35 U.S.C. 154(b) by 0 days.

(21) Appl. No.: 15/841,406

(22) Filed: Dec. 14, 2017

(51) Int. Cl.
| | | |
|---|---|---|
| *F21V 9/00* | (2018.01) | |
| *F21S 43/236* | (2018.01) | |
| *F21S 41/24* | (2018.01) | |
| *F21S 43/247* | (2018.01) | |
| *G02B 27/30* | (2006.01) | |
| *F21S 43/14* | (2018.01) | |
| *F21S 41/20* | (2018.01) | |
| *F21S 43/20* | (2018.01) | |
| *F21S 41/141* | (2018.01) | |
| *F21Y 115/10* | (2016.01) | |

(52) U.S. Cl.
CPC ........... *F21S 43/236* (2018.01); *F21S 41/141* (2018.01); *F21S 41/24* (2018.01); *F21S 41/285* (2018.01); *F21S 43/14* (2018.01); *F21S 43/247* (2018.01); *F21S 43/26* (2018.01); *G02B 27/30* (2013.01); *F21Y 2115/10* (2016.08)

(58) Field of Classification Search
CPC ... F21S 48/1241; F21S 48/215; F21S 48/2268
USPC .......................................................... 362/511
See application file for complete search history.

(56) References Cited

U.S. PATENT DOCUMENTS

| | | | |
|---|---|---|---|
| 3,028,787 A | 4/1962 | Burch | |
| 4,353,617 A | 10/1982 | Tokumitsu et al. | |
| 5,453,877 A | 9/1995 | Gerbe et al. | |
| 6,022,114 A | 2/2000 | Foo | |
| 7,055,995 B1 * | 6/2006 | Condon | B63B 45/04 |
| | | | 359/641 |
| 7,810,975 B2 * | 10/2010 | Specht | F21S 41/143 |
| | | | 362/555 |
| 2002/0071267 A1 * | 6/2002 | Lekson | F21S 43/249 |
| | | | 362/610 |
| 2006/0039160 A1 * | 2/2006 | Cassarly | A47F 11/10 |
| | | | 362/551 |
| 2012/0020103 A1 * | 1/2012 | Okada | B60Q 1/2607 |
| | | | 362/510 |
| 2017/0184267 A1 * | 6/2017 | Courcier | F21S 41/24 |
| 2018/0118090 A1 * | 5/2018 | Lee | B60Q 1/04 |

FOREIGN PATENT DOCUMENTS

FR 2 487 970 A1 2/1982

* cited by examiner

*Primary Examiner* — Ahshik Kim
(74) *Attorney, Agent, or Firm* — Oblon, McClelland, Maier & Neustadt, L.L.P.

(57) ABSTRACT

A device, a light guide, and a method for automotive lighting are provided. The device includes a light source and a light guide. The light source provides light rays. The light guide includes two or more aspheric surfaces having at least a common focal point. The two or more aspheric surfaces are configured to maintain total internal reflection of the light rays in the light guide.

17 Claims, 3 Drawing Sheets

DEVICE FOR AUTOMOTIVE LIGHTING

BACKGROUND

Motor vehicles contain numerous lighting devices for both interior and exterior illumination. For example, exterior vehicle lighting devices may perform stop light functions, taillight functions, headlamp functions, daytime running light functions, dynamic bending light functions, and fog light functions.

A lighting device may include a light guide to guide light from a light source to an exit surface. Due to manufacturing and other design requirements, a flat light guide thickness may be restricted although a larger output spot size is desired. Accordingly, what is needed, as recognized by the present inventors, is a device for automotive lighting and signaling having an adaptable output spot size.

The foregoing "Background" description is for the purpose of generally presenting the context of the disclosure. Work of the inventors, to the extent it is described in this background section, as well as aspects of the description which may not otherwise qualify as prior art at the time of filing, are neither expressly or impliedly admitted as prior art against the present invention.

SUMMARY

An aspect of the present disclosure includes a device for automotive lighting. The device includes a light source configured to provide light rays and a light guide. The light guide includes two or more aspheric surfaces having at least a common focal point. The two or more aspheric surfaces are configured to maintain total internal reflection of the light rays in the light guide.

In a further aspect of the present disclosure, concave sides associated with the two or more aspheric surfaces are opposite to each other.

In a further aspect of the present disclosure, the aspherical surface is an elliptical surface.

In a further aspect of the present disclosure, the aspherical surface is a parabolic surface.

In a further aspect of the present disclosure, a height of the light rays at an exit surface of the light guide is a function of a first focal length associated with a first aspherical surface and a second focal length associated with a second aspherical surface.

In a further aspect of the present disclosure, the device further comprises a flat surface opposite to the first aspherical surface and a second flat surface opposite to the second aspherical surface, wherein the first flat surface is connected to the second aspherical surface.

In a further aspect of the present disclosure, the light guide includes a flat section.

In a further aspect of the present disclosure, the device further includes a collimator configured to collimate light rays from the light source.

In a further aspect of the present disclosure, the light source is a light emitting diode.

In a further aspect of the present disclosure, the device further comprises an outer lens operatively coupled to the light guide.

An aspect of the present disclosure includes a light guide for automotive lighting.

The light guide includes two or more aspheric surfaces having at least a common focal point, the two or more aspheric surfaces configured to maintain total internal reflection of light rays propagating in the light guide.

An aspect of the present disclosure includes a method for controlling output light rays. The method includes providing a light guide operably coupled to a light source and providing two or more aspherical surfaces configured to maintain total internal reflection in the light guide. The two or more aspherical surfaces have at least one common focal point.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
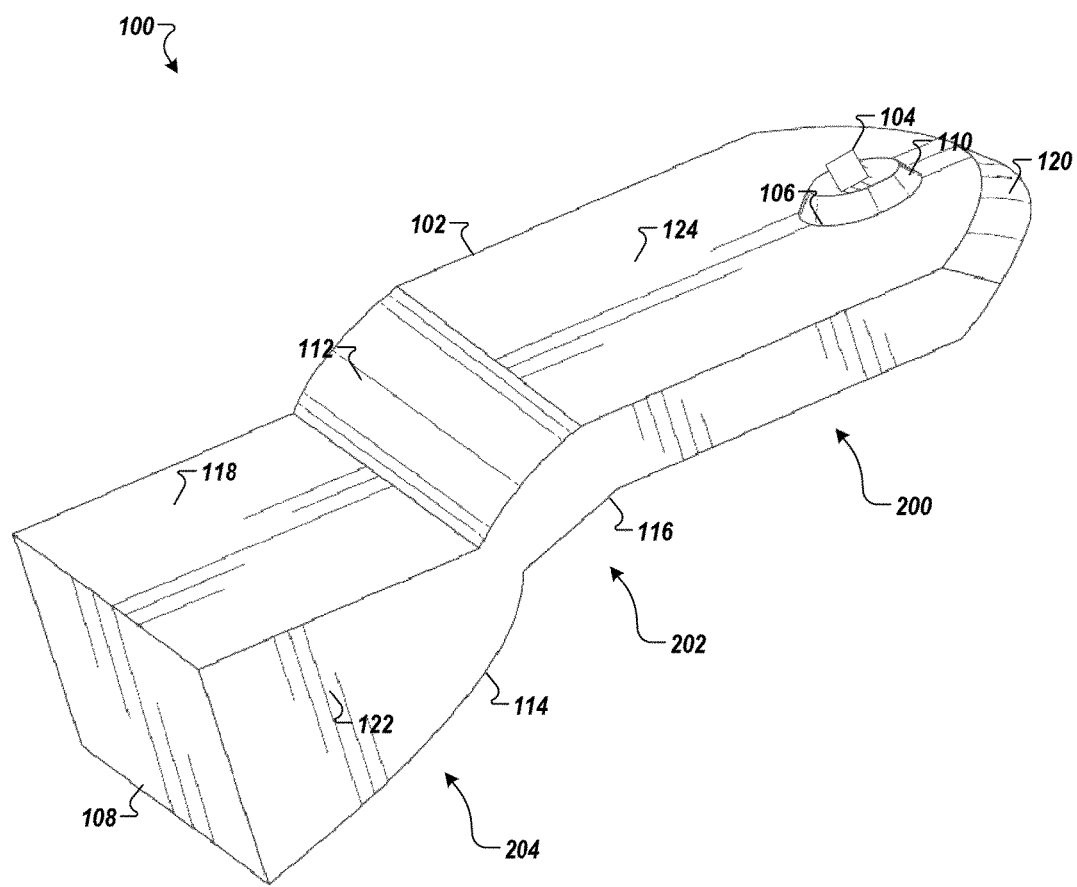
FIG. 1 is a schematic of a device for automotive lighting and/or signaling according to one example.

Referring now to the drawings, wherein like reference numerals designate identical or corresponding parts throughout several views, the following description relates to a lighting or signaling device for a motor vehicle and associated methodology for controlling an output spot size of light rays.

FIG. 1 is a schematic that shows a device 100 for automotive lighting and/or signalling according to one example. The device 100 may include a light guide 102 configured to propagate light rays emitted by a light source 104. The light guide 104 may be a structure formed by a glass material or a polymer material (e.g., polycarbonate, polymethyl methacrylate (PMMA)), or any other transparent material having a refractive index greater (e.g., 1.49 for PMMA) than the refractive index of the environment where the light guide 102 is used. In one implementation, the light guide 102 may also be made of a colored material (e.g., red, yellow) in accordance with the application for which the device 100 is used.

The light source 104 may include one or more light emitting devices (LEDs) or solid state light sources. The light emitted by the light source may have different shapes and colors based on the intended application. For example, the light source 104 may include an inorganic semiconductor light emitting diode or a laser diode, an organic light emitting diode (OLED), a polymer light emitting diode (PLED), a LED lamp package, a LED chip or a LED die, or an array of one or more of these devices. When a plurality of devices of LEDs is used, the LEDs may have the same or different colors. The light source 104 may be controlled using a controller (not shown). The light source 104 may include fiberoptic device outputs. In one example, the output power of the light source 104 may be based on the application.

The light guide 102 include an entrance surface 106 by which light rays from the light source 104 enter the light guide 102 and an exit surface 108 by which the rays exit the light guide 102. The light guide 102 is used to transmit light from the light source 104 to the exit surface 108. The light maintains total internal reflection (TIR). The light rays are guided along the light guide 102 by successive total reflection on one or more guiding surfaces of the light guide 102 as described further below. The light rays entering the light guide 102 are collimated. In other words, the rays are substantially parallel.

In one implementation, the light guide 102 may include a collimator 110. The collimator 110 is configured to collimate rays from the light source 104.

In one implementation, the collimator 110 may be positioned between the light source 104 and the light guide 102 for creating the collimated rays. In one example, the collimator 110 is a part of the device 100 and forms a continuous structure with the light guide 102. In other words, the light guide 102 and the collimator 110 may be molded as one entity. In other examples, the collimator 110 may be separate from the light guide 102.

In a first section 200 of the light guide 102, the light guide 102 may include two flat surfaces 124 substantially parallel to each other. The first section 200 may be of constant height. The collimated rays are not subjected to any modification in the first section 200 of the light guide 102. The light guide 102 may have a rectangular cross section in the first section 200.

In a second section 202, the light guide 102 includes a first aspheric surface 112. In a third section 204, the light guide 102 includes a second aspheric surface 114 having at least a common focal point with the first aspheric surface 112. In the second section 202, the light guide includes a flat surface 116 opposite to the first aspheric surface 112. The flat surface 116 connects the flat surface 124 of the first section 200 to the second aspheric surface 112. In the third section 204, the light guide 102 includes a second flat surface 118 that is opposite to the second aspheric surface 114.

In one implementation, at least one of the aspherical surfaces 112, 114 may be an elliptical surface. In other implementations, all the aspherical surfaces can be elliptical surfaces.

In one implementation, at least one of the aspherical surfaces 112, 114 may be a parabolic surface. In other implementations, all the aspherical surfaces can be parabolic surfaces.

The first aspheric surface 112 and the second aspheric surface 114 function to control an output size of the light rays. The first aspheric surface 112 and the second aspheric surface 114 are optimized for a minimum package needed to maintain total internal reflection inside the light guide 102. The first aspherical surface 112 and the second aspheric surface 114 may be a parabolic surface, an elliptical surface, or a hyperbolic surface. The first aspheric surface 112 and the second aspheric surface 114 face each other. In other words, the concave side of each of the first aspheric surface 112 and the second aspheric surface 114 face each other. In one implementation, the at least common focal point is located inside the light guide 102.

The light rays are incident on and totally reflected of the first aspheric surface 112. Then, the light rays are incident on and totally reflected of the second aspheric surface 114. Parallel rays to the axis of the first aspheric surface (i.e., direction of collimated in the first section) are reflect to the common focal point. The light rays passing by the common focal point of the second aspheric surface 114 are then collimated. Thus, the first aspheric surface 112 is optimized such as an incident ray have an incident angle with respect to the normal of the first aspheric surface greater than a critical angle of reflection is capable of being totally reflected by the first aspheric surface 112. The second aspheric surface 114 is also optimized such as the light rays reflected from the first aspheric surface 112 have an incident angle with respect to the a normal to the second aspheric surface 114 greater than a critical angle of reflection and are capable of being totally reflected by the second aspheric surface 114.

The light guide 102 may be delimited laterally by a rear edge 120 and side edges 122. In one implementation, the light rays may be input via the rear edge 118. In one implementation, the side edges 120 are perpendicular to the guiding surfaces (i.e., first aspheric surface 112, second aspheric surface 114, first flat surface 116, second flat surface 118, flat surfaces 124). The height of the light guide 102 may vary along a longitudinal direction of the light guide 102.

In one implementation, the device 100 may be fabricated using injection molding techniques. The light guide 102 and the collimator 110 may be made using one piece of material.

Figure 2:
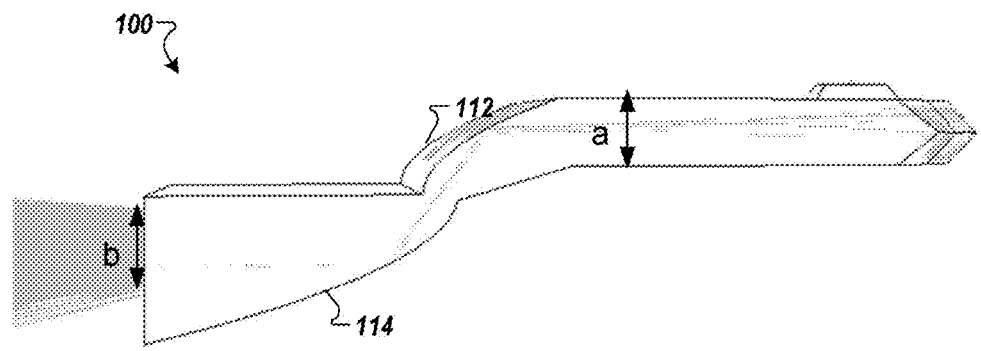
FIG. 2 is a side view of the device for automotive lighting and/or signaling according to one example.

FIG. 2 is a side view of the device 100 to one example. The height of the beam at the exit surface 104 is indicated by "b" in FIG. 2. The height of the beam in the first section 200 of the light guide 102 is indicated by "a". The ratio between "b" and "a" is proportional to the ratio between a first focal length associated with the first aspherical surface 112 and a second focal length associated with the second aspherical surface 114. In FIG. 2, the ratio between "b" and "a" is 1. The height of the beam is not changed by the aspheric surfaces.

Figure 3:
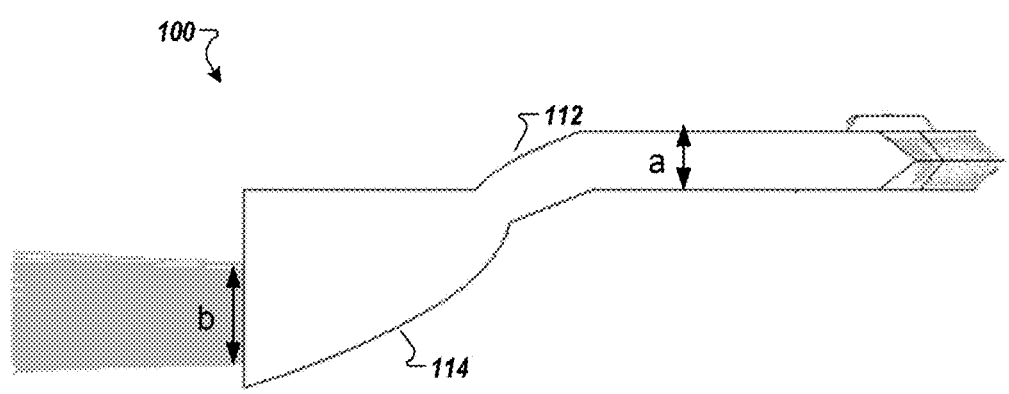
FIG. 3 is a side view of the device for automotive lighting and/or signaling according to another example.

FIG. 3 is a side view of the device 100 according to one example. In FIG. 3, the ratio between "b" and "a" is 2. Thus, the height of the exiting beam is double the height of the beam in the first section 200 of the light guide 102. Thus, by changing the focal length associated with each of the aspherical surfaces, the height of the beam at the exit surface 108 may be adapted to the application.

Figure 4:
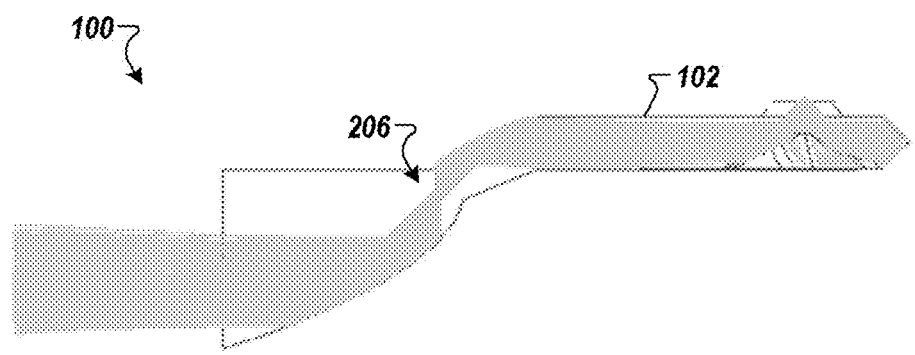
FIG. 4 is a side view of the device that shows an optical path of the light according to one example.

FIG. 4 is a side view of the light guide 102 that shows a light rays path according to one example. Point 206 indicates the common focal point for the exemplary aspheric surfaces shown in FIG. 4. In one implementation, an exit surface thickness may vary from 5 mm up to 100 mm.

In one implementation, the light guide 102 may include one or more additional sections to reorient the exit direction of the rays. An orientation angle may vary based on the application. In one implementation, the rays may be reoriented by 90°.

In one implementation, the device 100 may include optics deposited at the exit surface 108. The optics are configured to redirect the light from the device 100. In one implementation, a separate outer lens may be used. The separate outer lens may include spreading elements to direct the light in a desired direction. For example, the outer lens may be made of plastic, glass, or any transparent covers such as a tail light cover. The separate lens may also provide aesthetic advantages for the light guide 102.

Obviously, numerous modifications and variations are possible in light of the above teachings. It is therefore to be understood that within the scope of the appended claims, the invention may be practiced otherwise than as specifically described herein.

A device which includes the features in the foregoing description provides numerous advantages. In particular, a variable output size may be obtained while adhering to manufacturing requirements.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

The invention claimed is:

1. A device for automotive lighting, the device comprising:
   a light source configured to provide light rays; and
   a light guide including two or more aspheric surfaces having at least a common focal point, the two or more aspheric surfaces being configured to maintain total internal reflection of the light rays in the light guide, wherein a height of the light rays at an exit surface of the light guide is a function of a first focal length associated with a first aspherical surface and a second focal length associated with a second aspherical surface.

2. The device of claim 1, wherein concave sides associated with the two or more aspheric surfaces are opposite to each other.

3. The device of claim 1, wherein at least one of the aspherical surfaces is an elliptical surface.

4. The device of claim 1, wherein at least one of the aspherical surfaces is a parabolic surface.

5. The device of claim 1, further comprising a first flat surface opposite to the first aspherical surface and a second flat surface opposite to the second aspherical surface, wherein the first flat surface is connected to the second aspherical surface.

6. The device of claim 1, wherein the light guide includes a flat section.

7. The device of claim 1, further comprising a collimator configured to collimate light rays from the light source.

8. The device of claim 1, wherein the light source is a light emitting diode.

9. The device of claim 1, further comprising an outer lens operatively coupled to the light guide.

10. A light guide for automotive lighting, the light guide comprising:
    two or more aspheric surfaces having at least a common focal point, the two or more aspheric surfaces configured to maintain total internal reflection of light rays propagating in the light guide, wherein a height of the light rays at an exit surface of the light guide is a function of a first focal length associated with a first aspherical surface and a second focal length associated with a second aspherical surface.

11. The light guide of claim 10, wherein concave sides associated with the two or more aspheric surfaces are opposite to each other.

12. The light guide of claim 10, wherein at least one of the aspherical surfaces is an elliptical surface.

13. The light guide of claim 10, wherein at least one of the aspherical surfaces is a parabolic surface.

14. The light guide of claim 10, wherein the light guide includes two aspheric surfaces.

15. The light guide of claim 10, further comprising a first flat surface opposite to the first aspherical surface and a second flat surface opposite to the second aspherical surface, wherein the first flat surface is connected to the second aspherical surface.

16. The light guide of claim 10, further comprising a flat section.

17. A method for controlling output light rays, the method comprising:
    providing a light guide operably coupled to a light source;
    providing two or more aspherical surfaces configured to maintain total internal reflection in the light guide; and
    wherein the two or more aspherical surfaces have at least one common focal point, a height of the light rays at an exit surface of the light guide being a function of a first focal length associated with a first aspherical surface and a second focal length associated with a second aspherical surface.

* * * * *